Figure 1:
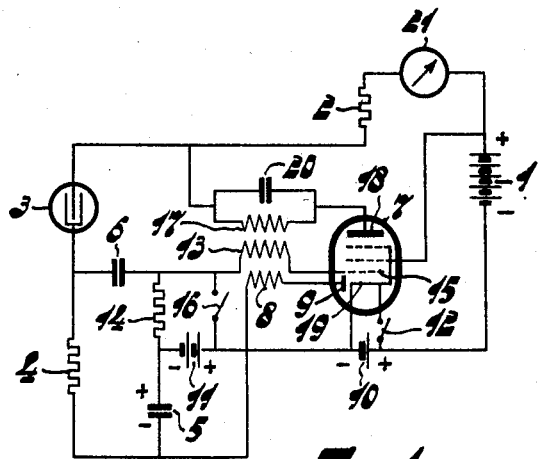

Nov. 4, 1952     G. HEPP     2,617,043

IONIZATION CHAMBER AND ASSOCIATED CIRCUIT

Filed May 16, 1950

*INVENTOR.*
GERARD HEPP
BY
AGENT

Patented Nov. 4, 1952

2,617,043

UNITED STATES PATENT OFFICE 2,617,043

IONIZATION CHAMBER AND ASSOCIATED CIRCUIT

Gerard Hepp, Eindhoven, Netherlands, assignor to Hartford National Bank and Trust Company, Hartford, Conn., as trustee Application May 16, 1950, Serial No. 162,158
In the Netherlands June 25, 1949

7 Claims. (Cl. 250—83.6)

This invention relates to circuit-arrangements comprising a direct-voltage source of comparatively high voltage for the supply of a consumer device absorbing energy in a pulsewise manner.

In such circuit-arrangements it is in certain cases desirable that the utmost economy should be practised with regard to the consumption of electrical energy. This applies inter alia in those cases in which the use of batteries are used. Batteries of comparatively high voltage are not efficacious for small powers on account of their life, volume, weight and cost. It is known that a low direct voltage may be transformed into a higher direct voltage by means of mechanical converters, for example rotary converters or by means of electrical converters such as circuits comprising vibrators and transformers or electrical valve generators.

The use of such devices thus permits of taking high voltage from a low-voltage battery, which constitutes a gain in an economic respect. However, if a consumer device absorbing energy in a pulsewise manner is supplied in this way, the efficiency is still found to be comparatively low, more particularly if it is desired to maintain the direct voltage to be supplied to the consumer device, constant within certain limits.

The object of the invention is to mitigate this disadvantage.

According to the invention, a circuit-arrangement having a direct-voltage source of comparatively high voltage for supplying a consumer device absorbing energy in a pulse-wise manner is characterised in that the direct-voltage source is constituted by a transformer the secondary voltage of which is rectified and supplied to a condenser to which the consumer device is connected by way of a resistance, if desired an inductive resistance, whereas the primary winding of the transformer forms part of the output circuit of an electric discharge tube, which, normally, is cut off and the input circuit of which includes the said resistance, so that the discharge tube becomes conductive for a very short time upon occurrence of an energy-absorbing pulse in the consumer device, the discharge tube being fed from a direct-voltage source having a voltage which is lower than that of the first-mentioned source.

The discharge tube becomes conductive only if an energy-absorbing pulse occurs in the consumer device. This results in a current pulse being produced in the output circuit, which brings about a voltage pulse across the primary winding of the transformer. The corresponding voltage pulse across the secondary winding thereof is rectified and recharges the condenser to which the consumer device is connected. The voltage drop across this condenser brought about by the energy absorbed by the consumer device is thus compensated. The efficiency of the transformation of the direct-current energy, similarly as in circuit-arrangements of known type, is not 100%. However, the higher total efficiency of the circuit-arrangement according to the invention is achieved in that the transformation does not take place continuously but as a function of the energy-absorbing pulses. So long as such pulses do not occur, there is no loss of energy in transformation since in this case transformation does not take place.

It is evident that the primary and secondary windings of the transformer need not necessarily be separate windings and an autotransformer may be used.

In the circuit-arrangement according to the invention, use may be made of a discharge tube of any type known for this purpose such, for example, as an electron tube having a heated cathode, or a discharge tube having a cold cathode. Use is preferably made of a tube the bulb of which also houses a rectifier which serves to rectify the secondary voltage of the transformer. A further improvement in efficiency may be obtained by utilizing a discharge tube including a rectifier, the two systems having a common incandescent cathode.

The fact that transformation of energy does not occur in the absence of energy-absorbing pulses may result in the voltage across the condenser to which the consumer device is connected leaking away. However, in practice, it has been found that in most consumer devices absorbing energy in a pulsewise manner, the time-intervals between the energy-absorbing pulses are not so great that the voltage leak becomes troublesome. With a suitable choice of the value of the condenser in view of the time-interval between successive pulses, the voltage across the condenser remains reasonably constant. When the circuit-arrangement according to the invention is applied to a device for determining the ionisation produced, for example, by a radio-active preparation, in which event the ionisation tube, for example a Geiger-Müller tube, serves as the consumer device, there is the additional advantage that the time-intervals between successive energy-absorbing pulses never exceed a given value determined by, for example, cosmic radiation.

If the input and output circuits of the discharge tube are coupled regeneratively, the discharge tube may operate as a blocking oscillator. Each energy-absorbing pulse then produces a short oscillation of the discharge tube-transformer circuit, so that an alternating voltage is produced from which is derived the direct voltage by which the condenser is recharged.

If the consumer device is constituted by an ionisation tube and an associated extinguishing circuit, then the advantage may be obtained that the discharge tube forming part of the direct-voltage source also forms part of the extinguishing circuit, since the output circuit of this tube is connected to the circuit including the ionisation tube. The current pulse or pulses occurring in the output circuit of the discharge tube then not only generate the direct voltage but also extinguish the ionisation tube.

The circuit-arrangement according to the invention, after being switched in, may not itself start to generate the high direct-voltage. This occurs inter alia, if the control grid of the discharge tube has applied to it a negative bias which provides that, normally, the tube is cut off. A switch will in this case be provided in the input circuit of the discharge tube to make this tube conductive for a very short time. As an alternative, the bias for the control-grid cutting off the tube during the absence of pulses, may be taken by means of a rectifier from the transformer. The discharge tube will now become conductive immediately upon being switched-on so that the high direct-voltage is generated and the negative bias to cut off the tube is generated at the same time. If the condenser should be suddenly discharged during the operation of the circuit, for example due to a short-circuit, the condenser is, in this case, recharged automatically.

When the circuit-arrangement according to the invention is applied to a device for counting or recording the occurrence of ionising particles, the circuit may have derived from it, as is known per se for such devices, a quantity which is a measure of the number of ionisations occurring in the ionisation tube during each unit-time. Use may be made of a meter or other suitable mechanical or electrical instrument for counting each individual ionisation, or as an alternative an instrument may be used indicating the average current as a measure of the number of ionisations per unit-time. The quantity which is a measure of the number of ionisations or of the number of ionisations per unit-time may be derived from the output circuit of the discharge tube or alternatively from the transformer with the use of a second rectifier. The oscillatory circuit comprising the transformer will be excited upon ocurrence of an energy-abstracting pulse. The first-mentioned rectifier which provides the high direct-voltage is so connected as to be conductive during the first half-wave of the oscillation occurring, the condenser then being charged. The second rectifier is so connected as to be operative during the second-half-wave of the oscillation set up at the transformer. The aforementioned counting quantity is derived from the circuit which includes the second rectifier. For example, this circuit may include a meter having electrical or mechanical inertia such that the mean current strength is indicated. The energy which is accumulated in the magnetic circuit of the transformer and which is not used for generation of the high direct-voltage is thus utilized for obtaining the above-mentioned quantity.

Figure 2:
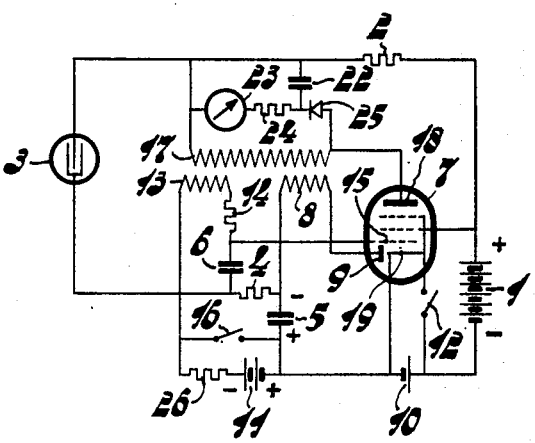

The invention will now be explained more fully by reference to the accompanying diagrammatic drawing, given by way of example, in which Figs. 1 and 2 show embodiments of the circuit-arrangements according to the invention applied to a device for measuring the ionisation produced, for example, by a radio-active preparation.

Referring now to Fig. 1, a battery 1, having a voltage of the order of, say, 100 volts, is included in the output circuit of a thermionic pentode tube 7, connected between the anode 18 and the cathode 19 in series with a meter 21, a resistance 2 and the primary winding 17 of a transformer 17—13—8, which is shunted by a condenser 20. The cathode 19 of the pentode 7 is supplied from a battery 10 with the use of a switch 12. A battery 11 provides the negative bias for the control grid 15 of the pentode 7 by way of a resistance 14 and winding 13. A condenser 5 is connected in series with the batteries 1, 10, 11 and is charged in the manner indicated. Connected to the direct-voltage source constituted by the batteries 1, 10, 11 and the condenser 5 is the series-combination of a resistance 4 and an ionisation tube 3, while this series-combination also includes the meter 21 and the resistance 2, which also form part of the output circuit of the pentode 7. The series-combination of the battery 11 and the resistance 14 is shunted by a switch 16. The junction of the resistance 4 and the condenser 5 is connected by way of the winding 8 to the anode 9 of a rectifier which has a common cathode 19 with the pentode.

The operation of the circuit is as follows: When switch 12 is closed, the pentode 7 remains cut off due to the negative grid-bias of the battery 11. When the switch 16 is closed for a very short time, this bias is switched off, with the result that the pentode 7 becomes conductive. The circuit starts to self-oscillate due to the regenerative coupling brought about by the windings 13 and 17 of the transformer 17—13—8, a high alternating voltage thus being set up across the winding 8. This alternating voltage is rectified by the diode 9—19 and the condenser 5 is consequently charged, with the polarity indicated, up to a voltage of the order of 1,000 volts. This voltage is chosen to be such that the total voltage applied across the ionisation tube 3 lies within the working range of this tube. When the switch 16 is opened the self-oscillation ceases but the charge on the condenser 5 will subsist, at least for the time being. If, now, ionisation in tube 3 occurs, the tube will become conductive. A voltage appears across the resistance 4 which is transferred by condenser 6 and the winding 13 to the control grid 15. The latter becomes more positive so that the pentode 7 becomes operative and the circuit starts to self-oscillate. The condenser 5 which is partly discharged by the ionisation occurring in the tube 3, is thus recharged. Furthermore, as a result of the current flowing through the output circuit of the pentode 7, a voltage appears across resistance 2, which voltage decreases the voltage across tube 3. The voltage set up across the resistance 4 is active in the same sense. The decrease in voltage across the tube 3 has the effect of extinguishing the discharge therein. The control grid 15 becomes more negative and the pentode 7 again becomes cut off. The electrical energy taken from the condenser 5 has thus been replenished in the meantime and this cycle is repeated upon occurrence of a subsequent pulse. The pulses brought about by the ionisations are indicated by the meter 21. If this meter has sufficient inertia or if the pulses follow one another with sufficient speed, the meter 21 will indicate the mean value of the current occurring, which value is a measure of the number of pulses occurring per unit-time. As a matter of fact, the pulses derived from the output circuit of the pentode may alternatively be supplied to an electrical or mechanical counter or to any other suitable recording instrument.

It is evident that the battery 10 is required to supply heating current but that the battery 1 is not loaded during the time-interval between successive pulses.

If no ionisations were to occur for a very long period, the charge of the condenser 5 would leak away so that ionisations could no longer occur in the tube 3. However, even in the absence of radio-active preparations, in most cases sufficient pulses will occur as a result of cosmic radiation and other phenomena, to keep condenser 5 charged. If desired, a weakly radio-active preparation may be provided in the vicinity of the ionisation tube 3.

The discharge tube 1 in this case also forms part of the circuit for extinguishing the tube 3.

In Fig. 2 elements corresponding to Fig. 1 are indicated by the same reference numerals and the operation of the circuit-arrangement is similar. A resistance 26 in this case, serves to limit the current which occurs upon closing the switch 16. A meter 23 is connected in series with a resistance 24 and a rectifier 25 to the primary winding 17 of the transformer 17—13—8. A condenser 22 ensures that the meter 23 indicates the mean current. Upon oscillation of the circuit of tube 7, the condenser 5 is charged by wave of the rectifier 9, 19 during the first half-wave and the condenser 22 is charged by way of the rectifier 25 during the second half-wave. All the energy accumulated in the transformer circuit per complete oscillation is thus utilised, so that the loss of energy due to the damping resistance of this circuit is a minimum. By a suitable choice of the resistances 2 and 4 and of the voltage across the tube 3, it may be ensured that the discharge of tube 3 is extinguished in the meantime and the circuit-arrangement is thus restored to a condition suitable for responding upon an ionisation occurring very soon after a prior ionisation. Extinguishing may alternatively be effected by omitting the resistance 2 and connecting the ionisation tube 3 to the anode 18 of the tube 7, instead of to the junction of the meter 23 and the winding 17.

The voltage set up across the winding 17 then operates as an extinguishing voltage. This voltage may be further increased by stepping up the voltage across the winding 17, for example, with the use of an autotransformer. The diagram of Fig. 2 may be simplified by replacing the switch 16, the resistance 26 and the battery 11 by a non-linear resistance and a condenser connected in parallel therewith, the non-linear resistance being so proportioned that it has a high value for voltages lower than the desired negative control-grid bias but materially decreases at a grid-bias which is more positive. In this case, the grid current of tube 7 brings about the negative grid bias.

What I claim is:

1. Apparatus for deriving from a low voltage source a relatively high direct voltage to be supplied to a device absorbing pulsatory energy, said apparatus comprising a transformer having primary and secondary windings, a capacitance, rectifier means coupling said capacitance to said secondary winding to charge said capacitance to said high voltage when a transient voltage is induced across said secondary winding, a resistance, means to couple said capacitance through said resistance to said device to impress said high voltage thereon, an electron discharge tube having input and output electrodes, an input circuit coupled to said input electrode and including said resistance, means to apply a bias voltage to said input circuit to maintain said tube normally non-conductive, an output circuit coupled to said output electrode and including said primary winding, and means to apply the low voltage from said source through said primary winding to said output electrode whereby when said device absorbs pulsatory energy, the resultant pulse across said resistance renders said tube momentarily conductive, thereby inducing a transient voltage across said secondary winding.

2. Apparatus as set forth in claim 1 further including switching means in said input circuit to remove said bias voltage and thereby render said tube momentarily conductive to effect charging of said capacitance.

3. Apparatus for deriving from a low voltage source a relatively high direct voltage to be supplied to a device absorbing pulsatory energy, said apparatus comprising a transformer having primary and secondary windings, a capacitance, rectifier means coupling said capacitance to said secondary winding to charge said capacitance to said high voltage when a transient voltage is induced across said secondary winding, a resistance, means to couple said capacitance through said resistance to said device to impress said high voltage thereon, an electron discharge tube having input and output electrodes, an input circuit coupled to said input electrode and including said resistance, means to apply a bias voltage to said input circuit to maintain said tube normally non-conductive, an output circuit coupled to said output electrode and including said primary winding, means for regeneratively coupling said output circuit to said input circuit, and means to apply the low voltage from said source through said primary winding to said output electrode whereby when said device absorbs pulsatory energy, the resultant pulse across said resistance renders said tube momentarily conductive, thereby inducing a transient voltage across said secondary winding.

4. Apparatus as set forth in claim 3 wherein said transformer has a tertiary winding which is included in said input circuit.

5. Apparatus as set forth in claim 3 wherein said device is constituted by an ionization tube and further including an extinguishing circuit for said ionization tube.

6. Apparatus for deriving from a low voltage source a relatively high direct voltage to be supplied to a device absorbing pulsatory energy, said apparatus comprising a transformer having primary and secondary windings, a capacitance, rectifier means coupling said capacitance to said secondary winding to charge said capacitance to said high voltage when a transient voltage is induced across said secondary winding, a resistance, means to couple said capacitance through said resistance to said device to impress said high voltage thereon, an electron discharge tube having control and output electrodes, an input circuit coupled to said control electrode and including said resistance, means including a rectifier coupled to one of said windings to apply a bias voltage to said input circuit to maintain said tube normally non-conductive, an output circuit coupled to said output electrode and including said primary winding, and means to apply the low voltage from said source through said primary winding to said output electrode whereby when said device absorbs pulsatory energy, the resultant pulse across said resistance renders said tube momentarily conductive, thereby inducing a transient voltage across said secondary winding.

7. Apparatus for deriving from a low voltage source a relatively high direct voltage to be supplied to an ionization device absorbing pulsatory energy, said apparatus comprising a transformer having primary and secondary windings, a capacitance, means including a first rectifier coupling said capacitance to said secondary winding to charge said capacitance to said high voltage when a transient voltage is induced across said secondary winding, a resistance, means to couple said capacitance through said resistance to said device to impress said high voltage thereon, an electron discharge tube having control and output electrodes, an input circuit coupled to said control electrode and including said resistance, means to apply a bias voltage to said input circuit to maintain said tube normally non-conductive, an output circuit coupled to said output electrode and including said primary winding, means to apply the low voltage from said source through said primary winding to said output electrode whereby when said device absorbs pulsatory energy, the resultant pulse across said resistance renders said tube momentarily conductive, thereby inducing a transient voltage across said secondary winding, and means coupled to said device to measure the number of ionizations occurring therein per unit time, said means including a second rectifier coupled to said primary winding and conductive in opposing sense with said first rectifier.

GERARD HEPP.

No references cited.